March 14, 1961 A. H. EBERMAN 2,974,701
CONTINUOUS CHOPPER
Filed Dec. 10, 1957 3 Sheets-Sheet 1
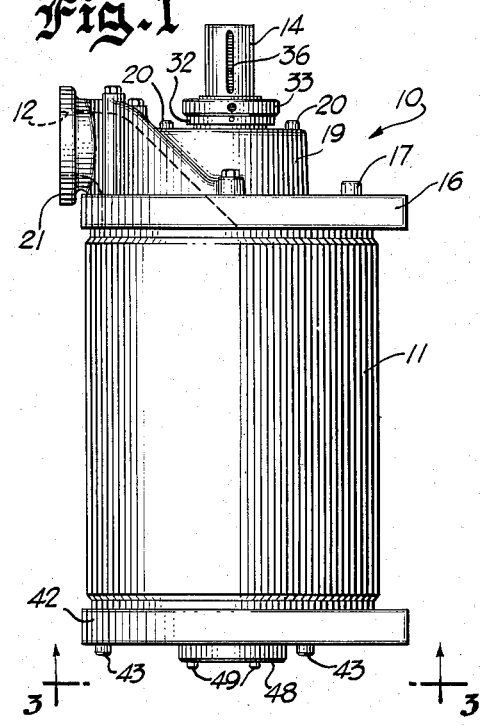
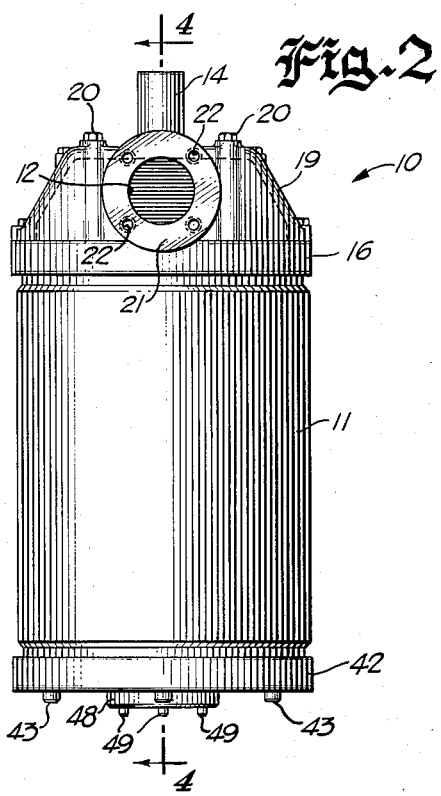
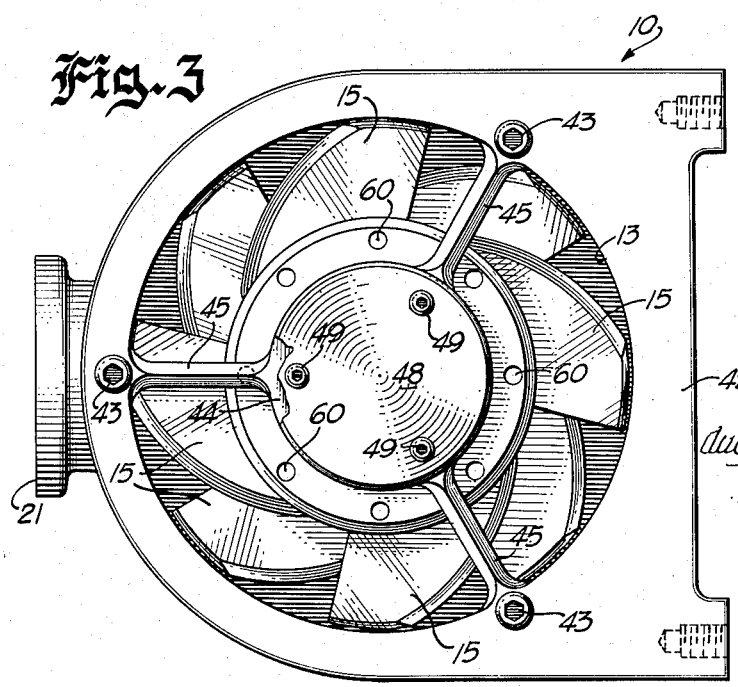
INVENTOR
Augustus H. Eberman,
by
Cromwell, Greist
and Warden
ATTORNEYS.

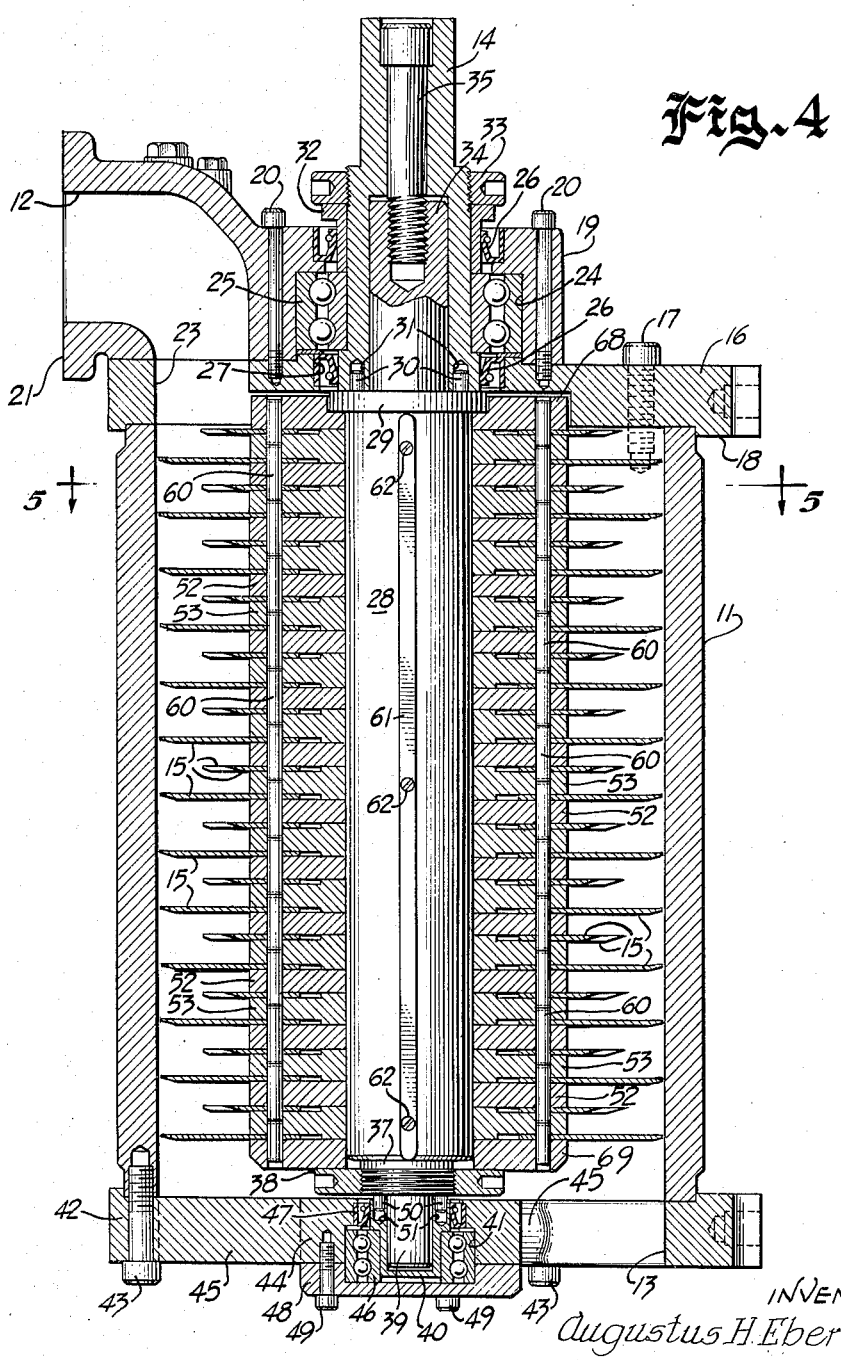

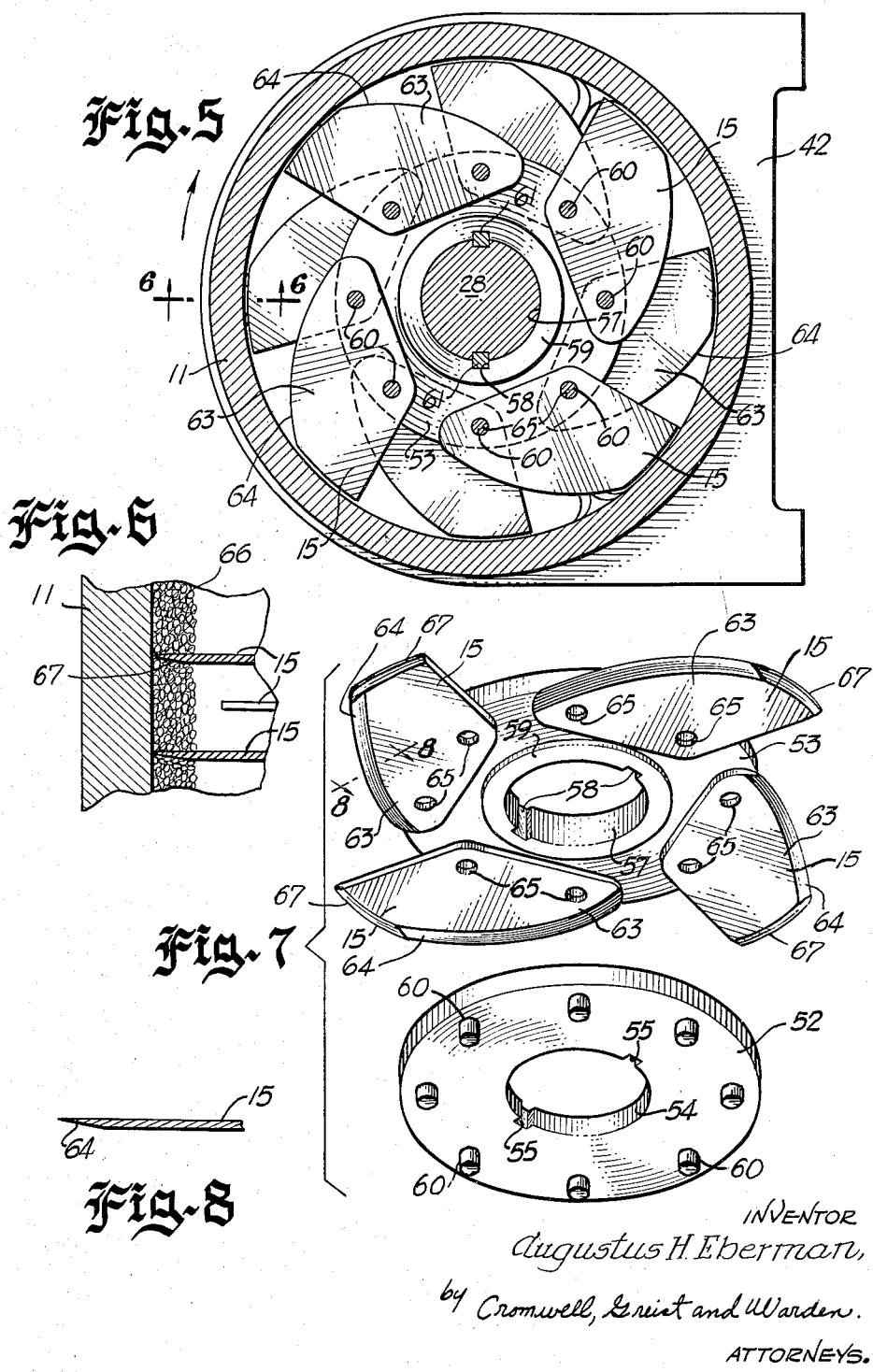

United States Patent Office 2,974,701
Patented Mar. 14, 1961

2,974,701

CONTINUOUS CHOPPER

Augustus H. Eberman, Madison, Wis., assignor to Oscar Mayer & Co., Inc., Chicago, Ill., a corporation Filed Dec. 10, 1957, Ser. No. 701,815

4 Claims. (Cl. 146—192)

The present invention is directed to a new and improved material comminuting device particularly adapted for use in finely chopping meat in preparation for sausage making. More specifically, the continuous chopper of the present invention operates in an improved manner whereby material is continuously moved through the device and is reduced to a finely chopped state with the least amount of bruising or mashing of the material and while utilizing a minimum of work in the form of input energy. Continuous chopping of the material occurs during movement of the same through the chopper in the form of a continuously moving sleeve of comminuted material maintained in association with the outer peripheral portions of blade members operated at high speed.

Comminution of meat for various purposes, such as sausage making, has been and is now in many instances being carried out by either the use of grinding apparatus or chopping apparatus, such as a "silent cutter," wherein chunks of meat are placed in a bowl-like container and subjected to the comminuting action of rotary knives or the like. The grinding of meat is considered undesirable in certain respects, particularly in connection with the formation of a compressed mass of meat particles which mass must be completely separated for mixing in a batter during the formation of sausage products. During grinding of meat the meat particles are subjected to appreciable compression and their general appearance and quality are adversely affected.

Of the general known types of chopping devices which are in use at the present time, the open bowl arrangement has certain disadvantages as, for example, the necessity of relying on batch operation to provide comminuted meat particles for sausage making purposes. Furthermore, meat particle comminution may be substantially non-uniform if special care is not taken. In at least certain arrangements the bowl containing the meat under comminution must be revolved or moved relative to the chopping knives in order to obtain proper comminuting contact between all of the meat carried by the bowl with the knives. In many instances the experience of the operator is relied upon to determine the attaining of adequate comminution of the meat and in order to be assured of such an attainment the meat is often subjected to longer periods of comminution than are actually necessary.

Certain continuous types of meat choppers have been proposed wherein a plurality of blade members are rotatably mounted within an enclosed cylindrically housing. Meat particles are fed into the housing at one end thereof with the blade members being designed to advance the meat through the housing toward an outlet end thereof while finely comminuting the same. High speed choppers of this type are known wherein the blades are rotated at relatively high speed for the purpose of finely comminuting the meat during movement of the same through the housing. In certain instances cutting bar-type projections have been formed on the inner surface of the housing for cooperation with the rotating blades to further aid in providing for adequate comminution of the meat passing therethrough. However, in operational use of the type of enclosed choppers which are allegedly capable of continuous operation, thus presumably avoiding time-consuming batch operations, the results of continuous operation are not as favorable as expected. In certain instances meat particles accumulate within the housing out of contact with the chopping blades and are not continuously moved through the housing. This type of stagnant accumulation not only encourages rancidity but also can result in excessive working of the accumulation to an extent that the binding properties of the meat particles are substantially destroyed for sausage making purposes. The provision of cooperating projections or cutting bar ribs on the inner surface of the housing for comminution purposes not only tends to interfere with continuous movement of the meat particles through the housing, but further creates the problem of proper blade positioning and balancing maintenance to assure cooperation between the ribs and the rotating blades for comminuting purposes.

It is an object of the present invention to provide a new and improved continuous chopper particularly adapted for sausage making purposes, the chopper including a smooth, uninterrupted, inner cylindrical surface along which meat particles are continuously advanced with the minimum of work between an inlet end and an outlet end of the chopper, the chopper including a series of moving blades which are designed to establish and maintain with the aid of centrifugal force a continuous layer of continuously moving material undergoing comminution along the surface, the blades being arranged to move freely through the layer to finely comminute the material thereof in a uniform and non-destructive manner.

A further object is to provide a new and improved continuous chopper for preferably vertical operation and including a cylindrical housing having an inlet at the top and an outlet at the bottom thereof for downward feeding of material under comminution, the housing having a smooth inner surface with which a plurality of blade members mounted for rotation at high speeds are operatively associated, the blade members with the aid of centrifugal force cooperating with the inner surface of the housing to define a continuously downwardly moving sleeve of accumulated material along the inner surface of the housing through which the outer peripheral edges of the blade members freely move with a minimum of work to finely and uniformly comminute the material, the chopper housing completely enclosing the comminution area defined internally thereof to allow controlled atmosphere comminution if desired, the blade members being of uncomplicated and inexpensive design and being mounted relative to a rotatable shaft for rotation therewith by an improved mounting arrangement including blade spacing and mounting elements.

Other objects not specifically set forth will become apparent from the following detailed description made in conjunction with the drawings wherein:

Fig. 1 illustrates the continuous chopper of the present invention in side elevation;

Fig. 2 is a front elevation of the chopper as viewed from the left in Fig. 1;

Fig. 3 is an enlarged bottom plan view of the chopper as viewed generally along line 3—3 of Fig. 1;

Fig. 4 is an enlarged partial vertical section of the chopper taken generally along line 4—4 of Fig. 2;

Fig. 5 is a transverse sectional plan view taken generally along line 5—5 of Fig. 4;

Fig. 6 is an enlarged fragmentary elevation, partly in section and taken generally along line 6—6 of Fig. 5;

Fig. 7 is an exploded perspective of the blade mounting and spacing elements forming a part of the chopper; and Fig. 8 is an enlarged fragmentary section of a marginal edge of a blade member taken generally along line 8—8 of Fig. 7.

Figs. 1–3 illustrate the continuous chopper 10 of the present invention as including a cylindrical housing 11 in the form of a cylindrical casing having attached to the top thereof a cover assembly defining an inlet opening 12 and at the bottom thereof an outlet opening plate assembly defining an outlet opening 13. A rotatable drive shaft member 14 extends through the inlet opening assembly and is attached to a shaft mounted in the housing 11 for rotation thereof in a manner to be described, the shaft having associated therewith a plurality of preferably staggered blade members 15 some of which are shown as viewed through the outlet opening 13 of the housing 11 in Fig. 3.

Referring particularly to Fig. 4, a top plate 16 is secured by a plurality of fasteners 17 to the top edge of the sleeve housing 11, the bottom surface of the top plate 16 being provided with a peripheral shoulder portion 18 which is received about the outer surface of the housing 11 in overlapping sealed engagement therewith. The fastening means 17 extend downwardly through drilled openings in the top plate 16 into aligned tapped holes located in the top end surface of the sleeve housing 11. The top plate 16 has mounted thereon an inlet opening defining housing 19 which is secured by fasteners 20 to the top surface of the top plate 16. The housing 19 is provided with a flared inlet opening portion defining the inlet opening 12 and, as particularly shown in Fig. 2, the outer radial end of the flared portion is provided with a continuous flange attaching portion 21 having a plurality of circumferentially spaced tapped holes 22 through which fastening elements are adapted to be received for aligned connection of the inlet opening 12 with material feeding apparatus for continuous operation of the chopper 10.

The inlet opening 12 at the innermost end thereof is aligned with an opening 23 provided in the top plate 16 for introduction of material, such as chunks or particles of meat, into the interior of the sleeve housing 11 for comminution thereof by the rotating blade members 15. The inlet opening housing 19 is provided with a central drive shaft opening 24 which houses therein a ball bearing assembly 25 through which the drive shaft member 14 is journalled and at either end of which is seated a known type of shaft oil seal 26—26. The bearing opening 24 is aligned with an opening 27 in the top plate 16 in which is seated one of the shaft seals 26 and through which the drive shaft member 14 is received. The inner end of the drive shaft member 14 is drivingly connected to a blade mounting shaft 28 positioned within the sleeve housing 11. The shaft 28 at the top thereof is provided with a radially enlarged disk-like member 29 having pressed into the top surface thereof a plurality of axially directed drive pins 30—30 which are received in drive pin recesses 31—31 drilled in the bottom surface of the drive shaft member 14.

The drive shaft member 14 has received thereabout an annular bearing locking sleeve 32 which is held in place by a threadedly received lock nut 33. The disk 29 has further integrally formed therewith a centrally positioned upwardly directed stub shaft portion 34 which is received within the lower end of the drive shaft member 14 which is in the form of a sleeve. A locking bolt 35 extends downwardly through the top of the drive shaft member 14 and is threadedly received into the top portion of the stub shaft 34. The upwardly projecting outer peripheral portion of the drive shaft member 14 is provided with circumferential driving grooves 36, only one of which is shown in Fig. 1, utilized to drivingly interconnect the top portion of the drive shaft member to suitable drive means for continuously rotating the blade mounting shaft 28 within the sleeve housing 11.

The bottom end of the shaft 28 within the sleeve housing 11 is provided with a downwardly directed stub shaft portion 37 of reduced diameter which is threaded at its outermost end and receives thereabout a locking nut 38 for a purpose to be described. The end face of the stub shaft 37 has integrally formed therewith an outwardly projecting shaft portion 39 which is of further reduced diameter and which is received within a cap-like rotatable housing member 40 journalled within a central opening 41 of a bottom plate 42 suitably attached to the bottom of the sleeve housing 11 in overlapping sealing engagement thereto by a plurality of fastening elements 43. The bottom plate 42, as particularly shown in Fig. 3, is provided with a centrally located shaft housing 44 which is supported by a plurality of circumferentially spaced, radially outwardly directed web members 45 between which the outlet opening 13 is defined. The central housing 44 has rotatably journalled therein the cap-like member 40 by use of a ball bearing 46 inwardly of which is seated a known type of shaft sealing member 47. The opening 41 of the central housing 44 is closed off at the bottom thereof by a removable cap plate 48 fastened thereto by a plurality of threaded fasteners 49. The cap-like member 40 is driven by the shaft 28 through axially extending drive pins 50 pressed into the outer end of the stub shaft portion 37 in surrounding relation with the reduced shaft portion 39 and received in aligned openings 51 in the upper surface of the cap-like housing 40.

From the manner in which the blade member drive shaft 28 is mounted in the sleeve housing 11 as described above, it will be noted that the same may be readily dismounted for chopping maintenance purposes. With the removal of the locking bolt 35 and the fastening elements 17, the entire end assembly including the member 14, the inlet opening housing 19 and the top plate 16 can be readily removed out of association with the sleeve housing 11. The shaft 28 may then be lifted with its complement of blade members 15 intact out of the sleeve housing 11 by reason of the removable seating of the same in the shaft housing 44 of the bottom plate 42 by use of the pins 50 and cap-like housing 40. Ready replacement of the shaft 28 and its complement of blade members 15 can be attained in an obvious manner.

Still referring particularly to Fig. 4, the shaft 28 has received thereabout a plurality of paired blade mounting and positioning spacers of two different types, each type being designated by the numerals 52 and 53. The different types of spacers 52 and 53 are alternately positioned about the shaft 28 to mount the blade members 15 thereon in vertically spaced series.

Referring particularly to Fig. 7, the spacer 52 is in the form of a ring-like member having a central opening 54 therethrough which is provided with a pair of oppositely positioned, axially directed grooves 55 and which further near the outer peripheral edge thereof is provided with a series of circumferentially spaced, axially directed openings 56 having pressed therethrough a plurality of short blade member attaching pins 60. The spacer 53 is also in the form of a ring member having a central opening 57 provided with a pair of oppositely positioned, axially directed grooves 58. The central opening 57 is in the form of an integral sleeve defining on each side of the spacer 53 an axially projecting annular rib 59 which functions on each side of the spacer 53 to space the surfaces thereof from those of adjacent spacers 52 and provide a plurality of annular slots spaced along the shaft 28 into which the blade members 15 are received. The spacer 53 is provided with a plurality of circumferentially spaced openings which are aligned with the drive pins 60 of adjacent spacers 52.

The spacers 52 and 53 are spline connected to the shaft 28 by use of a pair of oppositely positioned key members 61 (see Figs. 4 and 5) which are detachably mounted in axially extending grooves in the shaft 28 by screws 62. The grooves 55 and 58 of the spacers 52 and 53, respectively, receive the key members 61 therein and the spacers 52 and 53 are splined to the shaft 28 for rotation therewith.

Each of the blade members 15, as particularly shown in Figs. 5 and 7, is of general triangular shape and is provided with a convex cutting edge portion 63 which is sharpened by a bevel 64. This edge constitutes the leading edge of each blade member 15 during rotation thereof with the shaft 28. The cutting or chopping edge portion 63 curves away from the direction of rotation of the shaft 28 and the outermost extremity of each blade member is closely associated with the inner surface of the sleeve housing 11 as particularly shown in Figs. 5 and 6. With this arrangement the outer end portion of each bevel 64 moves in close association with the inner surface of the sleeve housing 11 to finely comminute material therebetween. Each blade member 15 is provided with a pair of drilled openings 65 through which the attaching pins 60 are received to attach the blade members 15 in the annular slots intermediate the pairs of spacers 52 and 53. The outer peripheral annular portion of each spacer 53 is of a reduced thickness as compared with the thickness of the alternately positioned spacers 52 to thus define therebetween a plurality of axially spaced annular slots into which the blade members 15 are received. The blade members 15 are mounted to define a plurality of axially spaced circumferential series with the blade members of alternate series being preferably circumferentially staggered to provide the blade overlapping arrangement illustrated in Figs. 3 and 5.

As particularly shown in Fig. 5, the blade members 15 are mounted relative to the shaft 28 for clockwise rotation therewith as indicated by the arrow. With this type of rotation the leading convex edge portion 63 of each blade member 15 slopes rearwardly relative to the direction of movement of the same and extends across a circumferential material handling zone defined intermediate the spacers 52 and 53 and the inner surface of the sleeve housing 11. Material under comminution, such as meat used in sausage making, is introduced into the housing 11 through the inlet opening 12 in a continuous manner. The chunks or pieces of meat contacting the rotating blade members 15 are propelled by the blade members in response to the action of centrifugal force toward the inner surface of the sleeve housing 11 to define thereon a continuously moving sleeve-like accumulation 66 (see Fig. 6) of material undergoing comminution. As previously described, the outermost edges of the blade members 15 terminate in closely spaced relation to the inner surface of the housing 11 and each blade member freely moves through the accumulation of material to finely comminute the same during movement of the material toward the outlet opening 13 at the bottom of the housing 11. A slight bevel 67 is preferably supplied to the top surface of the outermost edge of each blade member 15 to narrow the edge and reduce the tendency of meat particles, particularly connective tissue, of becoming trapped and accumulated on the otherwise comparatively wide end area of the blade member due to the small clearance between the edge and the inner wall of the housing 11.

The pressure under which the material is delivered into the housing 11 through the inlet opening 12 forces the material downwardly through the housing 11 toward the outlet opening 13 at the bottom thereof. The smooth inner surface of the housing 11 provides for ease of movement of the accumulation 66 therealong and to further aid such movement, it is preferred that the chopper 10 be operated in a vertical position as illustrated in Figs. 1, 2 and 4. In this respect gravity aids continuous downward movement of the material undergoing comminution with the blade members 15 moving at high speeds through the same to provide uniform fine comminution of the material. The shaft 28 is designed for operation at high speeds, as for example, within the range of 3,000 to 4,500 r.p.m., operation at these speeds providing adequate centrifugal force to aid in maintaining continued definition of the sleeve-like accumulation 66 of the material. This accumulation will normally vary from approximately ½ to ⅝ of an inch with the outermost end portions of each blade member 15 continuously moving through the accumulation to an extent illustrated in Fig. 6.

With the structural arrangement described, material during its movement through the chopper is subjected to a minimum of turbulence, mashing or mixing so as to retain to the greatest possible degree the properties of the material while uniformly comminuting the same to a marked degree of fineness. This is of particular importance in preparing meat for sausage making at its desired to retain as much as possible of the binding properties of the meat. Excessive working, mashing or otherwise destructive cutting of the meat particles results in substantial destruction of the binding properties. Furthermore, such excessive working of meat during comminution can be detrimental in flavor retention as well as final appearance of the comminuted product. Free and continuous movement of the sleeve-like accumulation of meat downwardly along the inner surface of the housing 11 prevents stagnant accumulation within the chopper which leads to rancidity as well as overworking of the meat particles by subjecting the same to excessive chopping. The meat moves freely and quickly through the chopper while undergoing the proper degree of comminution and the blade members 15 cleanly contact the meat particles for size reduction purposes without mashing or otherwise overworking the same. With the unimpeded relatively free movement of the blades through the sleeve accumulation of meat within the chopper, a minimum of input energy is necessary to operate the chopper at peak efficiency. With this being possible, input energy is not appreciably dissipated in the form of heat and the meat undergoing comminution is not subjected to any appreciable increase in temperature during movement of the same through the chopper. The chopper, therefore, can be operated very efficiently while realizing excellent results in connection with uniform fine chopping of material.

The blade members 15 are of an uncomplicated design being very inexpensively formed by a punching operation. The manner of mounting the blade members relative to the shaft 28 is also uncomplicated and by utilizing a plurality of blade members in each vertical series, there is no problem of balancing the shaft 28 for efficient high speed operation. With the use of machined blades there is always the problem of balancing and special care must be taken in the assembling and maintaining of a chopper of this type. The convex chopping edge 63 of each blade member 15 may be often resharpened as there is a substantial amount of blade material extending rearwardly of the same. As shown in Fig. 8, the sharpening bevel 64 is preferably provided to the under surface of each blade member 15 and with this arrangement the bevel aids in moving the sleeve accumulation 66 of material downwardly through the housing 11. As previously described, the shaft 28 with the blade members mounted thereon can be readily removed from the interior of the housing 11 for maintenance purposes such as resharpening of the cutting edges 63 of the blade members.

While the use of a plurality of blade members 15 in defining each vertically spaced series is important from the standpoint of balancing, it is also important from the standpoint of efficiency of operation. As illustrated, the mounting arrangement for the blade members is such that each vertical series can have its blade members circumferentially staggered relative to the blade members of an adjacent series. This is readily accomplished by alternate staggered mounting of blade members. Blade overlapping between successive series provides for uniform, non-turbulent chopping action and by utilizing a plurality of blade members to define each series, the blade members may be of uncomplicated design and can be properly circumferentially spaced to allow unimpeded continuous downward movement of the sleeve accumulation 66 of material.

The assembly of spacers and blade members on the shaft 28 is completed by end plates or holding rings 68 and 69 at the top and bottom thereof. The top ring 68 is shaped to be received and held against the inner surface of the disk-like shoulder 29 of the shaft 28. The bottom ring 69 is received about the shaft 28 and held thereon by the lock nut 38. The spacers and blade member are loaded onto the shaft 28 from the bottom thereof with the lock nut 38 tightly clamping the final assembly. The pins 60 are force fitted in suitable pin receiving holes in the holding rings 68 and 69.

By use of a completely enclosed housing of the type disclosed, suitable means may be provided, if desired, to prevent excessive oxidation of the meat during chopping of the same. For example, an inert gas may be introduced into the housing 11 during the chopping operation. The continuous chopper provides a closed system and the atmospheric conditions under which the meat or other material is comminuted can readily be controlled.

Obviously many modifications and variations of the invention as hereinbefore set forth may be made without departing from the spirit and scope thereof, and therefore only such limitations should be imposed as are indicated in the appended claims.

I claim:

1. A continuous chopper for use in high speed comminution of meat, said chopper comprising a vertically positioned cylindrical housing provided with opposite end closure means, the upper end closure means including an inlet opening positioned to deliver meat downwardly into said housing along the inner surface thereof, the bottom end closure means including an outlet opening in communication with said housing to receive meat from the inner surface thereof for discharge from said chopper, a rotatable shaft in said housing extending centrally and axially downwardly therethrough, blade member mounting means on said shaft and keyed thereto for rotation therewith, said blade member mounting means being in the form of annular rings provided with a plurality of blade members removably mounted therebetween independent of said shaft to define a plurality of separate axially spaced circumferential series of blade members extending downwardly through said housing, each of said blade members being provided with a convex cutting edge extending into close proximity and in slight clearance with the inner surface of said housing, said inner surface being smooth for unimpeded flow of centrifugally accumulated meat downwardly therealong through said housing as aided by gravity, the blade members of adjacent series being circumferentially staggered relative to one another for continuous high speed comminution of meat along said inner surface during downward flow of said meat through said housing.

2. The chopper of claim 1 wherein said blade member mounting means are spaced to define annular slots therebetween in which said blade members are received, said blade member mounting means having a plurality of vertically directed blade member mounting pins which extend through holes in said blade members to removably mount said blade members for rotation with said shaft.

3. A continuous chopper for use in high speed comminution of meat, said chopper comprising a vertically positioned cylindrical housing provided with opposite end closure means, the upper end closure means including an inlet opening positioned to deliver meat downwardly into said housing along the inner surface thereof, the bottom end closure means including an outlet opening in communication with said housing to receive meat from the inner surface thereof for discharge from said chopper, a rotatable shaft in said housing extending centrally and axially downwardly therethrough, blade member mounting means on said shaft and keyed thereto for rotation therewith, said blade member mounting means being in the form of annular rings provided with a plurality of blade members removably mounted therebetween independent of said shaft to define a plurality of separate axially spaced circumferential series of blade members extending downwardly through said housing, each of said blade members being of generally triangular shape and provided with a convex cutting edge extending into close proximity and in slight clearance with the inner surface of said housing, said inner surface being smooth for unimpeded flow of centrifugally accumulated meat downwardly therealong through said housing as aided by gravity, the blade members of adjacent series being circumferentially staggered relative to one another for continuous high speed comminution of meat along said inner surface during downward flow of said meat through said housing.

4. The chopper of claim 3 wherein said blade member mounting means are spaced to define annular slots therebetween in which said blade members are received, said blade member mounting means having a plurality of vertically directed blade member mounting pins which extend through holes in said blade members to removably mount said blade members for rotation with said shaft.

References Cited in the file of this patent

UNITED STATES PATENTS

| | | |
|---|---|---|
| 546,550 | Packer | Sept. 17, 1895 |
| 1,446,221 | Starr et al. | Feb. 20, 1923 |
| 2,140,076 | Fromm | Dec. 13, 1938 |
| 2,742,937 | Herzer | Apr. 24, 1956 |

FOREIGN PATENTS

| | | |
|---|---|---|
| 650,591 | Germany | Sept. 25, 1937 |